United States Patent
Cordeiro et al.

(10) Patent No.: US 9,584,195 B2
(45) Date of Patent: Feb. 28, 2017

(54) MIMO AND BANDWIDTH SIGNALING IN MILLIMETER-WAVE SYSTEMS

(71) Applicant: INTEL IP CORPORATION, Santa Clara, CA (US)

(72) Inventors: Carlos Cordeiro, Portland, OR (US); Assaf Kasher, Haifa (IL); Solomon Trainin, Haifa (IL)

(73) Assignee: INTEL IP CORPORATION, Santa Clara, CA (US)

( * ) Notice: Subject to any disclaimer, the term of this patent is extended or adjusted under 35 U.S.C. 154(b) by 0 days.

(21) Appl. No.: 14/293,878

(22) Filed: Jun. 2, 2014

(65) Prior Publication Data

US 2015/0349857 A1  Dec. 3, 2015

(51) Int. Cl.
  *H04B 7/04* (2006.01)
  *H04L 29/06* (2006.01)

(52) U.S. Cl.
  CPC ........... *H04B 7/0413* (2013.01); *H04L 69/22* (2013.01)

(58) Field of Classification Search
  CPC .... H04W 28/26; H04W 72/04; H04B 7/0413; H04L 69/22
  See application file for complete search history.

(56) References Cited

U.S. PATENT DOCUMENTS

| | | | | |
|---|---|---|---|---|
| 2009/0310533 A1* | 12/2009 | Zheng et al. | | 370/328 |
| 2010/0157955 A1* | 6/2010 | Liu et al. | | 370/336 |
| 2011/0038332 A1* | 2/2011 | Liu et al. | | 370/329 |
| 2011/0090844 A1* | 4/2011 | Gong | H04W 52/0238 | 370/328 |
| 2012/0320856 A1* | 12/2012 | Kim et al. | | 370/329 |
| 2013/0155953 A1* | 6/2013 | Chu | H04W 28/20 | 370/328 |
| 2013/0294394 A1* | 11/2013 | Kneckt | H04W 74/0816 | 370/329 |
| 2013/0315219 A1* | 11/2013 | Cheong | H04W 28/16 | 370/338 |
| 2014/0064261 A1* | 3/2014 | Wang et al. | | 370/338 |
| 2014/0079016 A1* | 3/2014 | Dai et al. | | 370/330 |
| 2014/0185473 A1* | 7/2014 | Wong | H04W 72/1205 | 370/252 |

OTHER PUBLICATIONS

Khiam-Boon Png, IEEE 802.11-13/1291r2, Dynamic Bandwidth Control for 802.11aj (60GHz New Technique Proposal), Nov. 2013.*

Shiwen He, Haiming Wang, Yongming Huang, Wei Hong, Luxi Yang, Guangshi Yu and Bo Sun, IEEE 802.11-14/07116r3, PHY SIG Frame Structure for IEEE 802.11aj (45GHz), May 21, 2014.*

Carlos Cordeiro, Michael Sim, Chao-Chun Wang and Lei Huang,"Extending the 11 ad MAC for dynamic bandwidth management (60 GHz)", IEEE 802.11-13/1282r1, Oct. 2013.*

* cited by examiner

Primary Examiner — Aristocratis Fotakis

(57) ABSTRACT

Techniques to enable dynamic bandwidth management at the physical layer level while maintaining backwards compatibility in wireless systems is provided. Furthermore, techniques for reducing the occurrence of exposed nodes are provided. A transmitter may transmit a frame including an indication that a PHY layer sub-header defining a bandwidth associated with a channel is present. Furthermore, the transmitter may transmit a third frame after receiving a second frame from a receiver to indicate to legacy stations that the TXOP was successful.

20 Claims, 9 Drawing Sheets

MIMO AND BANDWIDTH SIGNALING IN MILLIMETER-WAVE SYSTEMS

TECHNICAL FIELD

Embodiments described herein generally relate to dynamic bandwidth management, MIMO and backward compatibility of modern millimeter wave systems.

BACKGROUND

In some conventional wireless systems, such as, for example, IEEE 802.11ad compliant systems, a single channel bandwidth is specified for use by all stations in the system. In particular, all stations use this single channel bandwidth for both transmitting and receiving. Dynamic bandwidth management (DBWM) schemes are being implemented to extend the capabilities of conventional wireless systems. For example, DBWM schemes such as channel bonding and channel halving are being used to increase throughput and reduce power requirements.

DBWM schemes, however, may not be backwards compatible with conventional stations in the wireless network. Furthermore, these DBWM schemes introduce what is referred to as the "exposed node problem." As will be appreciated, the exposed node problem occurs where a station in the wireless network receives a request-to-send (RTS) frame but does not receive the corresponding clear-to-send (CTS) frame or see the data transmission. Accordingly, the station may assume that the channel is open when in fact it is not. For example a conventional station can receive an RTS frame transmitted on a first channel but not the data if it is transmitted on a second channel and possibly not the CTS frame if it is directional.

It is with respect to the above that the present disclosure is provided.

DETAILED DESCRIPTION

Figure 1:
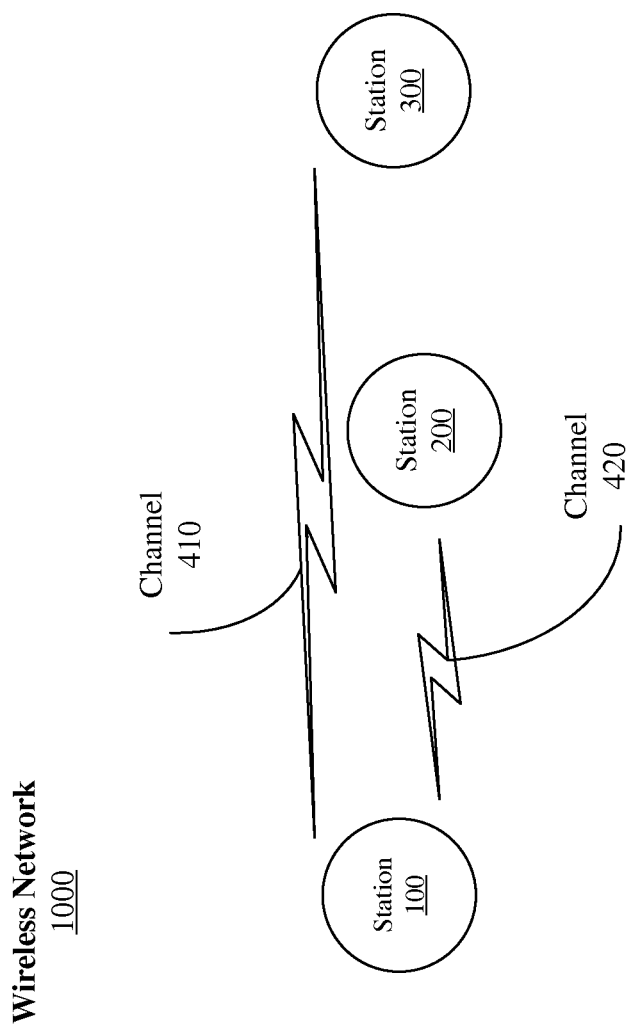
FIG. 1 illustrates an embodiment of a wireless system.

Examples are generally directed to systems and techniques for wireless signaling that support DBWM and additionally resolve the exposed node problem. In particular, systems and techniques for wireless signaling that facilitate channel bonding, channel halving, and/or multiple-input multiple-output (MIMO) transmission are disclosed. These disclosed techniques are backwards compatible with conventional stations such that the exposed node problem may be resolved. According to some examples, a transmitter may be configured to transmit a frame (e.g., a request-to-send (RTS) frame, or the like) including a physical (PHY) layer header that has one or more PHY layer sub-headers. The one or more PHY layer sub-headers specify the DBWM and/or MIMO schemes to be used to transmit data. The transmitter may additionally be configured to transmit an additional frame (e.g., a directional-multi-gigabit (DMG) clear-to-send (CTS) frame) to indicate to legacy stations to not occupy the channel for a period of time. Accordingly, the legacy station may leave the channel open, even though it cannot detect the data transmission, thereby solving the exposed node problem. This example and other examples implemented in accordance with the present disclosure will now be more fully described.

Reference is made to the drawings, wherein like reference numerals are used to refer to like elements throughout. In the following description, for purposes of explanation, numerous specific details are set forth in order to provide a thorough understanding thereof. It may be evident, however, that the novel embodiments can be practiced without these specific details. In other instances, well known structures and devices are shown in block diagram form in order to facilitate a description thereof. The intention is to cover all modifications, equivalents, and alternatives within the scope of the claims.

FIG. 1 is a block diagram illustrating an example wireless network 1000. In some examples, as shown in FIG. 1, the wireless network 1000 includes a transmitting station 100, a receiving station 200, and another station 300. It is important to note that the number of stations in the wireless network 1000 (e.g., the stations 100, 200, and 300) is shown at a quantity to facilitate understanding. It is to be appreciated, that the number of components can vary and may, in practice, be much greater than that shown. Furthermore, it will be appreciated that reference to the station 100 as a "transmitting station" and reference to the station 200 as a "receiving station" is done for purposes of illustration. Each of the stations 100 and/or 200 may be configured to transmit and/or receive as described herein. Furthermore, for purposes of illustration, the station 300 may be referred to as a "legacy station." This is done to illustrate the above described exposed node problem and how it may be solved by implementations of the present disclosure. In particular, the wireless system 1000 may be implemented to provide DBWM and/or MIMO schemes while maintaining backwards compatibility with legacy devices and additionally not introduce exposed nodes.

In some examples, the stations 100, 200, and/or 300 may be components in a wireless communication and/or broadband system operating in compliance with one or more wireless communication standards. For example, the wireless system 1000 may be implemented to operate in compliance with the Institute of Electrical and Electronics Engineers (IEEE) 802.11aj standard.

In general, the stations 100, 200, and 300 may be any of a variety of devices configured to provide wireless communication and/or connectivity as described herein. For example, the stations 100, 200, and 300 may be a cellular telephone, a smart phone, a tablet computer, a laptop computer, a mobile access point, a mobile hotspot, a wireless router, a wireless media device, or the like. Embodiments are not limited in this context.

As depicted, the stations 100, 200, and 300 may exchange signals over the wireless network 1000. Furthermore, the wireless 1000 may include multiple channels. In particular, the network 1000 may include channels corresponding to various DBWM schemes and/or MIMO techniques. For example, the network 1000 is depicted including a first channel 410 and a second channel 420. It is to be appreciated the channels (e.g., the first channel 410, the second channel 420, or the like) may correspond to a variety of different channels within the network 1000. For example, the first channel 410 may correspond to the IEEE 802.11ad channel while the second channel 420 may correspond to the IEEE 802.11aj channel. It is to be appreciated term channel and the depicted channels 410 and 420 are merely provided for illustrating the concept of DBWM and/or MIMO schemes being implemented to produce two different channels within the same wireless network. Examples are however not limited in this context.

The station 100 includes logic and/or features to transmit a frame using the first channel. The frame includes a PHY layer header and a PHY layer sub-header (refer to FIGS. 2A-2B). The PHY layer sub-header may include an indication of the second channel 420, which is to be used to communicate data between the stations 100 and 200. In general, the frame transmitted using the first channel may be any of a variety of types of frames. For example, the frame may be a control frame (e.g., an RTS frame, a CTS frame, a GRANT frame, or the like). In some examples, the frame may be a data frame. In some examples, the frame may be a management frame (e.g., a beacon frame, an association frame, a REQ/RSP frame, an authentication frame, an announce frame, or the like). Although the frame may be any type of frame, examples herein often refer to the frame as an RTS frame for purposes of convenience and clarity. However, this is not intended to be limiting. Furthermore, the example RTS frame may correspond to a convergence procedure (PLCP) protocol data unit (PPDU) and may be transmitted by the station 100 to initiate wireless communication with the station 200.

The station 100 is also configured to receive a directional multi-gigabit (DMG) clear-to-send (CTS) frame (refer to FIGS. 3 and 5) corresponding to the frame (e.g., the RTS frame) and to transmit a DMG-CTS-to-self frame including an indication that a transmit opportunity (TXOP) corresponding to the frame and the DMG-CTS frame was established over the first channel 410. Accordingly, the stations 100 and 200 may transmit signals conveying data using the second channel while the station 300 refrains from transmitting (e.g., due to setting its network allocation vector (NAV), or the like) during the TXOP.

The station 200 includes logic and/or features to receive a frame (e.g., the RTS frame) from the station 100 (refer to FIGS. 4-5) over the first channel 410. The frame including a PHY layer header and a PHY layer sub-header, the PHY layer sub-header including an indication of the second channel 420, which is to be used to communicate data between the station 100 and 200.

The station 200 is also configured to decode the PHY layer sub-header and determine at least a bandwidth corresponding to the second channel 420. Additionally, the station 200 is configured to transmit a frame corresponding to the received frame over the first channel 410 and to receive data over the second channel 420. In general, the frame transmitted by the station 200 may be any of a variety of types of frames. For example, the frame may be a control frame (e.g., an RTS frame, a CTS frame, a GRANT frame, or the like). In some examples, the frame may be a data frame. In some examples, the frame may be a management frame (e.g., a beacon frame, an association frame, a REQ/RSP frame, an authentication frame, an announce frame, or the like). Although the frame may be any type of frame, examples herein often refer to the frame as a directional multi-gigabit (DMG) clear-to-send (CTS) frame for purposes of convenience and clarity. However, this is not intended to be limiting.

Figure 2A:
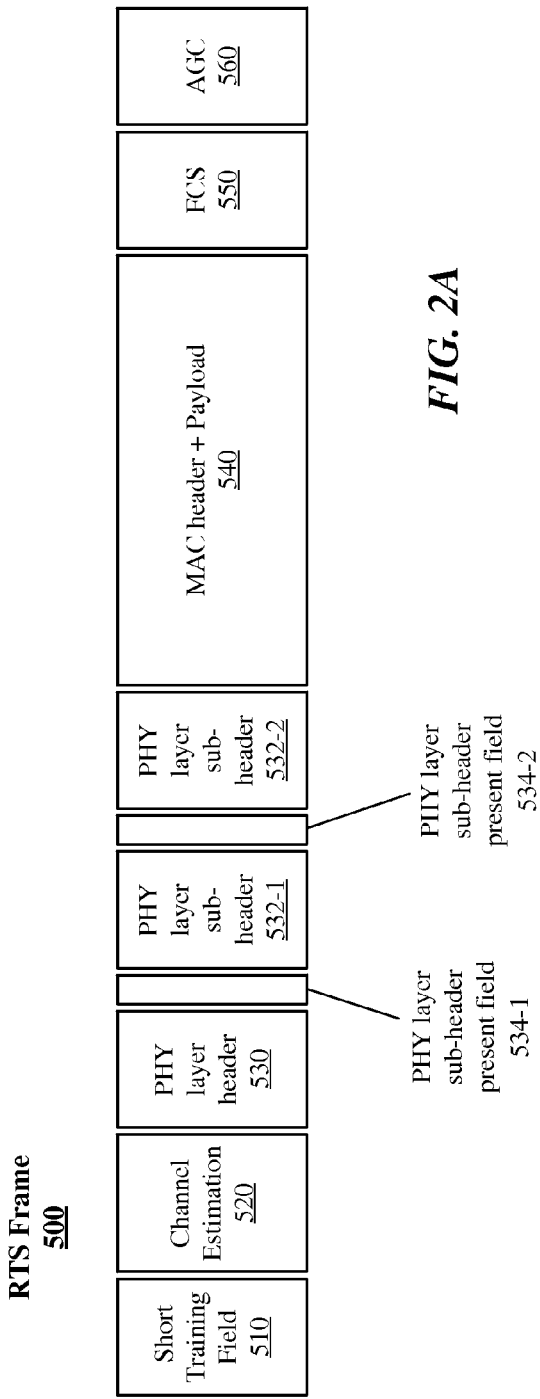
FIGS. 2A-2B illustrate examples of portions of a request-to-send (RTS) frame according to the present disclosure.

As detailed, the station 100 transmits a frame to a station (e.g., the station 200) over the first channel 100. FIG. 2A illustrates a block diagram on an example RTS frame 500, arranged according to the present disclosure. It is noted, that the RTS frame 500 is depicted as a PPDU compliant frame. Examples however are not limited in this context. Furthermore, as noted above, the station 100 may transmit a frame other than an RTS frame. However, an RTS frame is used in the following examples for purposes of illustration only. As shown, the RTS frame 500 includes a training field 510, a channel estimation field 520, a PHY layer header 530, a media access control (MAC) layer header and data payload 540, a frame control sequence (FCS) 550, and an automatic gain control (AGC) field 560.

The PHY layer header 530 includes one or more PHY layer sub-headers 532-$a$ and one or more corresponding PHY layer sub-header present fields 534-$a$, where $a$ is a positive integer. For example, the PHY layer header 530 is depicted including a first PHY layer sub-header 532-1 and a second PHY layer sub-header 532-2. Additionally, the PHY layer header 530 is depicted including the PHY layer sub-header present fields 534-1 and 534-2. In some examples, the PHY layer sub-header present fields 534-$a$ may be one or more reserved bits of the PHY layer header 530. Said differently, setting one or more of these reserved bits may be done to identify the presence of a PHY layer sub-headers 532-$a$.

A station receiving the RTS 500 (e.g., the station 200) may identify the presence of the PHY layer sub-headers 532-1 and 532-2 based on the PHY layer sub-header present fields 534-1 and 534-2 bits being set. The station can then correctly decode the PHY layer header 530 including the PHY layer sub-headers 532-1 and 532-2. Conversely, a legacy station (e.g., the station 300) receiving the RTS frame 500 will attempt to decode the RTS frame 500. However, the presence of the PHY layer sub-headers will cause the FCS 550 to fail. Accordingly, the legacy station will not misinterpret the RTS frame 500 and backwards compatibility issues can be avoided.

DBWM and/or MIMO schemes may be provided for or specified in the PHY layer sub-headers 532-$a$. For example, the first PHY layer sub-header 532-1 (also referred to as a high throughput (HT)-DMG PHY layer sub-header) may be used to define a bandwidth for establishing communication between the station sending the RTS 500 and the station receiving the RTS 500. As a specific example, the PHY layer sub-header 532-1 may be used to specify a bandwidth for the second channel 420 used to communicate between the stations 100 and 200. As another example, the first PHY layer sub-header 532-1 may be used to define a MIMO mode (e.g., number of streams, or the like). As a specific example, the PHY layer sub-header 532-1 may be used to specify MIMO modes for the second channel 420.

The second PHY layer sub-header 532-2 may be used to specify one or more MIMO mode training sequences to be used to establish MIMO communication (e.g., over the second channel 420) between the stations 100 and 200.

Figure 2B:
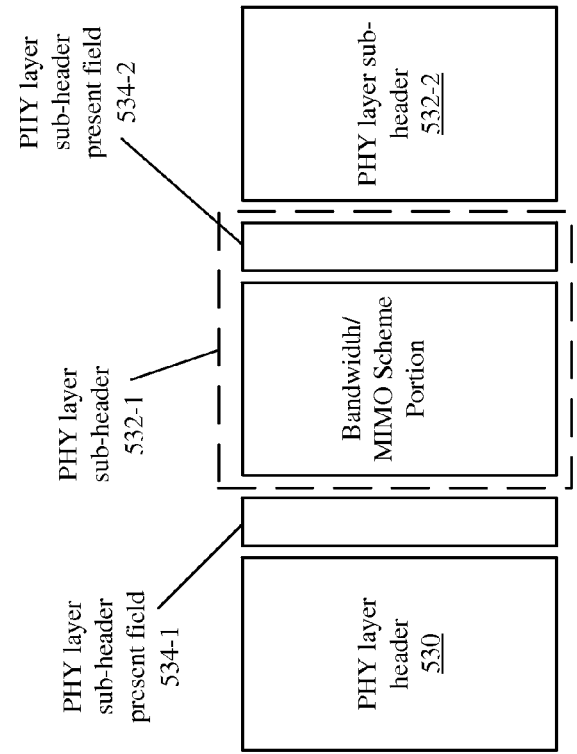

In some examples, the second PHY layer sub-header present field 534-2 may be part of the first PHY layer sub-header 532-1. In particular, FIG. 2B illustrates the PHY layer header 530 including the first PHY layer sub-header present field 534-1 and the first PHY layer sub-header 532-1. As shown, the second PHY layer sub-header present field 534-2 is part of the first PHY layer sub-header 532-1. For example, the last bit of the PHY layer sub-header 532-1 may be used as the field 534-2.

The following table illustrates an example of indications of the presence of a PHY layer sub-header 532-1 that may be defined in the PHY layer header 530.

| Field or Sub-header | Size (bits) | Definition |
|---|---|---|
| HT-DMG PHY layer sub-header present field (534-1) | 1 | 0: Can indicate that no HT-DMG PHY layer sub-header 532-1 is present.<br>1: Can indicate the HT-DMG PHY layer sub-header 532-1 is present. |

As noted herein, the PHY layer sub-header 532-1 may use one or more the reserved bits within the PHY layer header.

The following table illustrates an example of bandwidth and/or MIMO schemes that may be defined in the PHY layer sub-headers 532-a.

| Field or Sub-header | Size (bits) | Definition |
|---|---|---|
| HT-DMG PHY layer sub-header (532-1) Bandwidth Portion. | 4 | 0: 2.16 GHz (i.e., center frequency of the operating 802.11ad channel).<br>1: Upper 1.08 GHz of the operating 802.11ad channel.<br>2: Lower 1.08 GHz of the operating 802.11ad channel.<br>3: 802.11ad channel + Upper 2.16 GHz. (2 channel bonding)<br>4: 802.11ad channel + Lower 2.16 GHz. (2 channel bonding)<br>5: 802.11ad channel + Upper 4.32 GHz. (3 channel bonding)<br>6: 802.11ad channel + Lower 4.32 GHz. (3 channel bonding)<br>7: 802.11ad channel + Upper 2.16 GHz + Lower 2.16 GHz. (3 channel bonding)<br>8-15: Reserved |
| HT-DMG PHY layer sub-header (532-1) MIMO Mode Portion. | 3 | Indication of the MIMO mode, including the number of streams. |
| MIMO Training PHY layer sub-header present field (532-2) | 1 | 0: Can indicate that no MIMO training PHY layer sub-header 532-2 is present.<br>1: Can indicate the MIMO training PHY layer sub-header 532-2 is present. |
| MIMO Training PHY layer sub-header (532-2) | 8 | List of symbols to be used to MIMO training. |

It is worthy to note, that the above example definitions are given for illustration only. Particularly, they are given to illustrate how the PHY layer sub-headers 532-1 and 532-2 provide for DBWM and MIMO schemes and maintain backwards compatibility for legacy stations.

Figure 3:
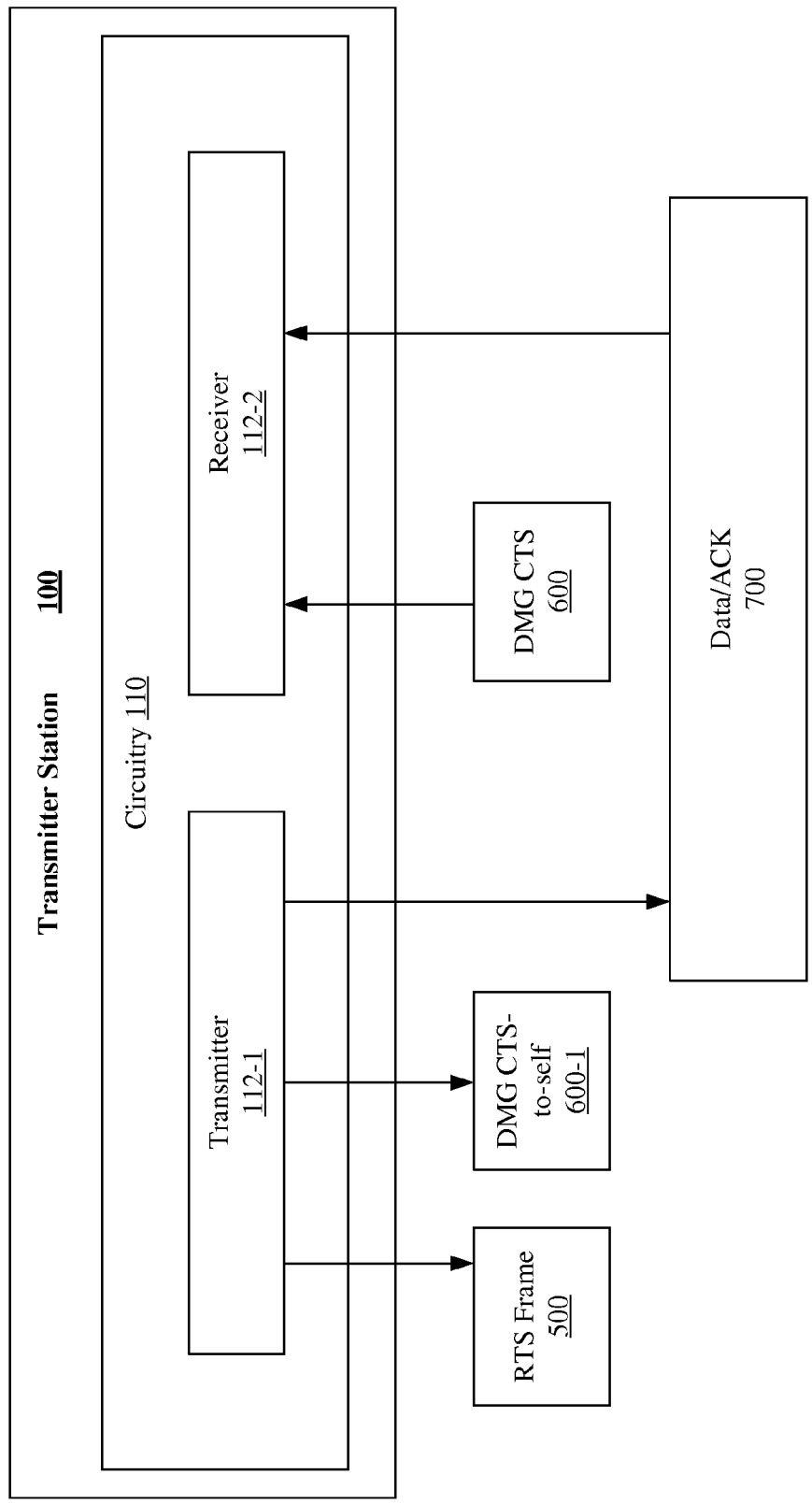
FIGS. 3-4 illustrate examples stations of the wireless system of FIG. 1 according to the present disclosure.
Figure 4:
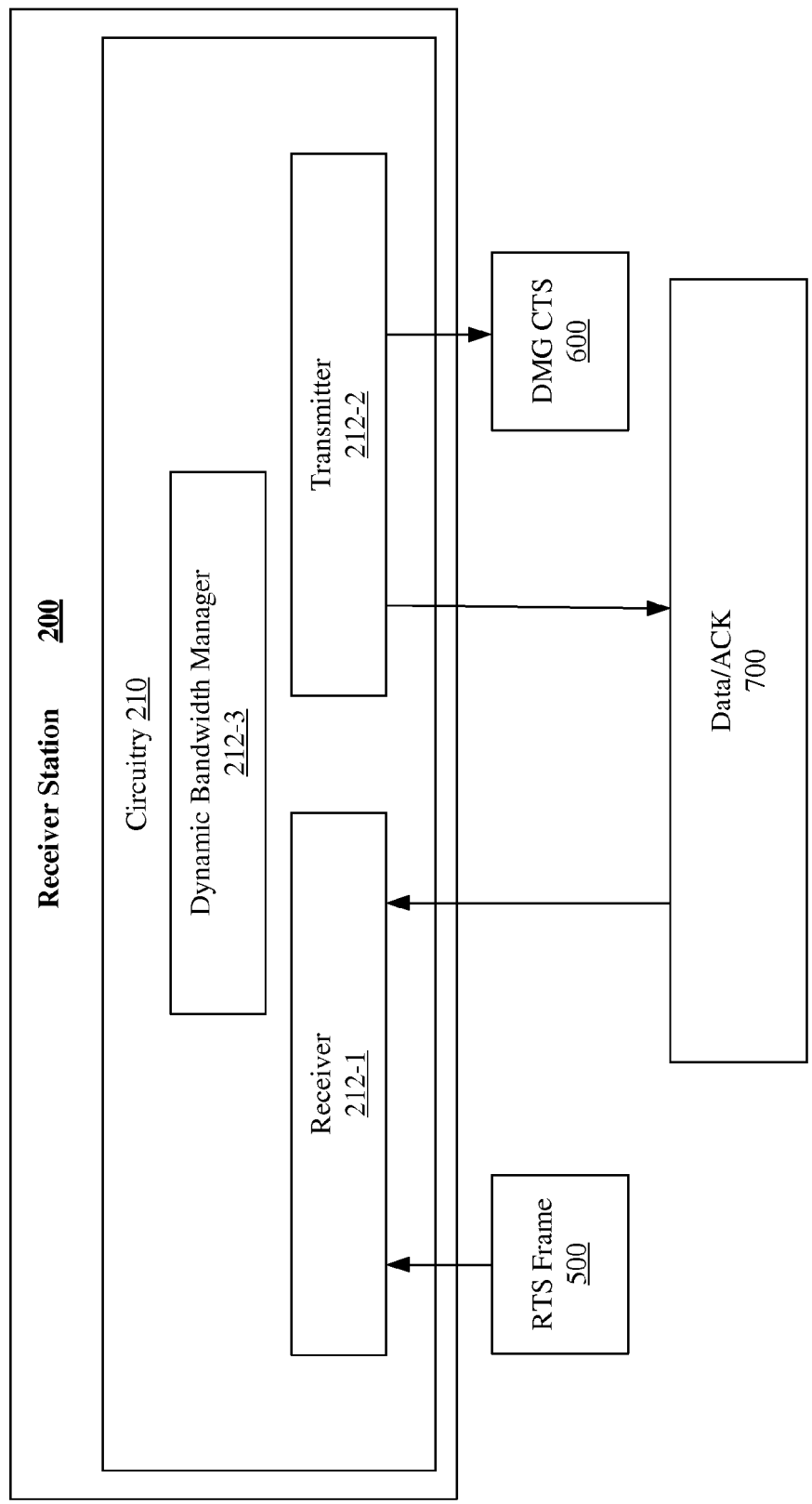

FIGS. 3-4 illustrate examples of the stations 100 and 200, arranged according to the present disclosure. In general, FIG. 3 depicts the example station 100 while FIG. 4 depicts the example station 200. The station 100 and the station 200 each include circuitry. For example, the station 100 includes circuitry 110 while the station 200 includes circuitry 210. In general, the circuitry 110 and 210 may each be arranged to execute one or more components 112-*a* and 212-*a*, respectively. The circuitry 110 and/or 210 may be any of various commercially available processors, including without limitation an AMD® Athlon®, Duron® and Opteron® processors; ARM® application, embedded and secure processors; IBM® and Motorola® DragonBall® and PowerPC® processors; IBM and Sony® Cell processors; Qualcomm® Snapdragon®; Intel® Celeron®, Core (2) Duo®, Core i3, Core i5, Core i7, Itanium®, Pentium®, Xeon®, Atom® and XScale® processors; and similar processors. Dual microprocessors, multi-core processors, and other multi-processor architectures may also be employed as the circuitry 110 and/or 210. According to some examples, the circuitry 110 and/or 210 may also be an application specific integrated circuit (ASIC) and components 112-*a* and/or 212-*a* may be implemented as hardware elements of the ASIC. According to some examples the circuitry 110 and/or 210 may also be a field programmable gate array (FPGA) and components 112-*a* and/or 212-*a* may be implemented as hardware elements of the FPGA.

Turning more specifically to FIG. 3, according to some examples, the station 100 may include a transmitter 112-1. The transmitter 112-1 can be operably coupled to the circuitry 110 and/or embodied in the circuitry 110. The transmitter 112-1 is configured to cause the circuitry 110 to transmit the RTS frame 500 using the first channel 410. As described above, the RTS frame 500 includes at least an indication of the bandwidth corresponding to the second channel 420. Additionally, the station 100 may include a receiver 112-2. The receiver 112-2 can be operably coupled to the circuitry 110 and/or embodied by the circuitry 110. The receiver 112-2 is configured to cause the circuitry 110 to receive a DMG CTS frame 600-1 corresponding to the RTS frame 500.

The transmitter 112-1 may be further configured to cause the circuitry 110 to transmit a DMG CTS-to-self frame 600-2 using the first channel 410. Additionally, the transmitter 112-1 and receiver 112-2 may be further configured to transmit and receive the data and acknowledgement (ACK) 700 over the second channel 420.

Figure 9:
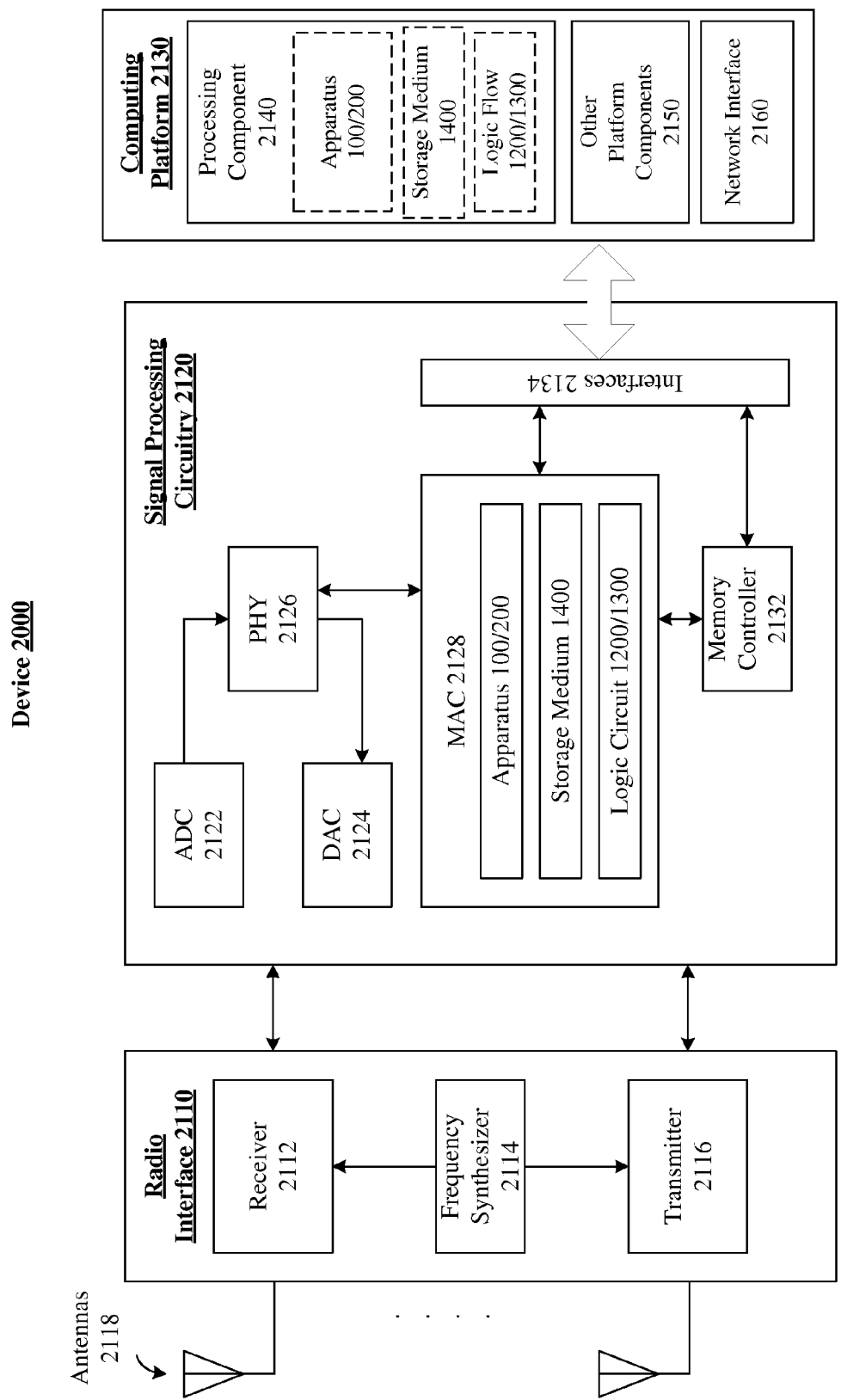
FIG. 9 illustrates a processing architecture according to an embodiment.

The transmitter station 100 may further include a number of antennas (refer to FIG. 9). As described above in conjunction with FIGS. 2A-2B, the RTS frame 500 includes the PHY layer sub-header 531-2. The PHY layer sub-header 531-2 can indicate a MIMO transmission scheme to be used to communicate data using the second channel 420. In particular, the MIMO scheme would utilize ones of the plurality of antennas (e.g., the antennas 2118 of FIG. 9).

The DMG CTS-to-self frame 600-1 is transmitted by the station 100 to indicate to other stations, and particularly to legacy stations, that a transmit opportunity (TXOP) was successfully established and the stations should set their NAV so as to not transmit on the channels 410 and/or 420 during the TXOP. This is explained in greater detail below with reference to FIG. 5.

Turning more specifically to FIG. 4, according to some examples, the station 200 may include a receiver 212-1. The receiver 212-1 can be operably coupled to and/or embodied in the circuitry 210. The receiver 212-1 is configured to cause the circuitry 210 to receive the RTS frame 500 using the first channel 410. Additionally, the station 200 may include a transmitter 212-2. The transmitter 212-2 can be operably coupled to and/or embodied in the circuitry 210 and configured to cause the circuitry 210 to transmit a DMG CTS frame 600-1 corresponding to the RTS frame 500.

The station 200 may further include a dynamic bandwidth determination module 212-3. The dynamic bandwidth determination module 212-3 may be operably coupled to and/or embodied by the circuitry 210 and configured to cause the circuitry 210 to decode the PHY layer sub-header(2) 532-1 and/or 532-2 from the RTS frame 500. In particular, the dynamic bandwidth determination module 212-3 may be configured to decode the PHY layer sub-header(s) 532-1 to determine a bandwidth and/or MIMO scheme corresponding to the second channel 420. Furthermore, the bandwidth determination module 212-3 may be configured to decode the second PHY layer sub-header 532-2 to determine a number of MIMO training sequences used to establish communication over the channel 420.

Additionally, the receiver 212-1 and the transmitter 212-2 may be further configured to receive and transmit the data and the acknowledgement (ACK) 700 over the second channel 420.

The receiver station 200 may further include a number of antennas (refer to FIG. 9). As described above in conjunction with FIGS. 2A-2B, the RTS frame 500 includes the PHY layer sub-header 531-2. The PHY layer sub-header 531-2 can indicate a MIMO transmission scheme to be used to communicate data using the second channel 420. In particular, the MIMO scheme would utilize ones of the plurality of antennas (e.g., the antennas 2118 of FIG. 9).

Figure 5:
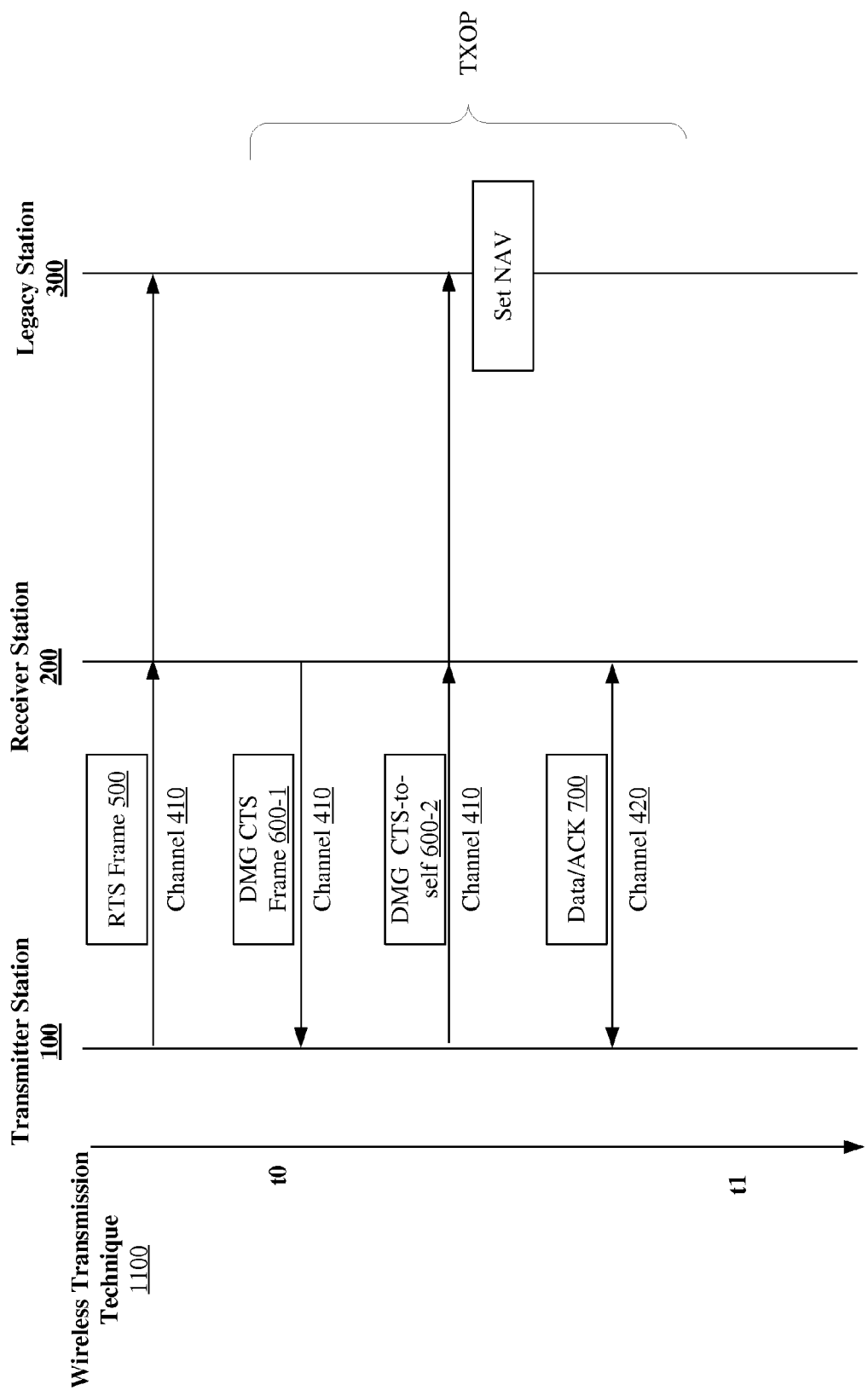
FIG. 5 illustrates a wireless transmission technique according to the present disclosure.

FIG. 5 illustrates a wireless transmission technique 1100 arranged according to the present disclosure. In general, the wireless transmission technique 1100 depicts example transmission of packets within the wireless network 1000. For example, the wireless transmission technique 1100 may be implemented by logic and/or circuitry of the stations in the wireless network 1000. The technique 1100 is shown with time interval t0 to t1. It is noted that this time scale is shown for illustrative purposes only and is not intended to indicate an actual amount of time between events depicted in the technique 1100 or an actual quantity of time represented. Furthermore, the time scale is shown for purposes of illustration only and any amount of time between events and the quantity of time may be implementation dependent.

Discussion of the wireless transmission technique is done with respect to the wireless network 1000 shown in FIG. 1 and particularly to the arrangement of the stations 100, 200, and 300. This is done for purposes of illustration in explaining the exposed node problem and how it is not introduced by the present disclosure. However, this is not intended to be limiting.

As depicted, the transmitting station 100 transmits the RTS frame 500 over the first channel 410. As will be appreciated, the receiving station 200 as well as the legacy station 300 receives the RTS frame 500. More particularly, as the RTS frame 500 is transmitted over a single channel such as an IEEE 802.11ad channel, both stations 200 and 300 will receive it. The receiving station 200 can decode the PHY layer sub-header(s) 532-1 and 532-2 to determine a bandwidth and/or MIMO scheme for the second channel 420. As noted above, the legacy station 300 cannot decode the PHY layer sub-header so the FCS will fail and the legacy station 300 will not respond to the RTS frame 500 or be able to determine a station to which the RTS frame 500 is targeted.

The receiving station 200 will however respond to the RTS frame 500 with the DMG CTS 600-1. However, due to the positioning of the receiving station 200 between the transmitting station 100 and the legacy station 300 (e.g., refer to FIG. 1) the legacy station 300 will not receive the DMG CTS 600-1. More specifically, as the DMG-CTS frame 600-1 is directional, and transmitted from the station 200 towards the station 100 (refer to FIG. 1) the legacy station 300 will not receive the DMG CTS frame 600-1 and will be "an exposed node". As such, the legacy station will not know or will not receive an indication that the channel 410 and/or 420 is going to be occupied. Said differently, as the TXOP would proceed without the legacy station 300 receiving any further frames, the legacy station would assume the TXOP was unsuccessful and may transmit interfering signals during the TXOP.

As such, the transmitting station 100 is configured to transmit the DMG CTS-to-self frame 600-2, which will be received by the receiving station 200 and legacy station 300. The legacy station 300, upon receiving the DMG CTS-to-self frame 600-2 can set its NAV. Said differently, the legacy station will receive an indication that the TXOP between the transmitting station 100 and the receiving station 200 was successful based on the DMG CTS-to-self frame 600-2 and set it NAV accordingly.

The stations 100 and 200 are configured to communicate (e.g., send data and ACK signals, or the like) during the TXOP on the second channel 420.

Figure 6:
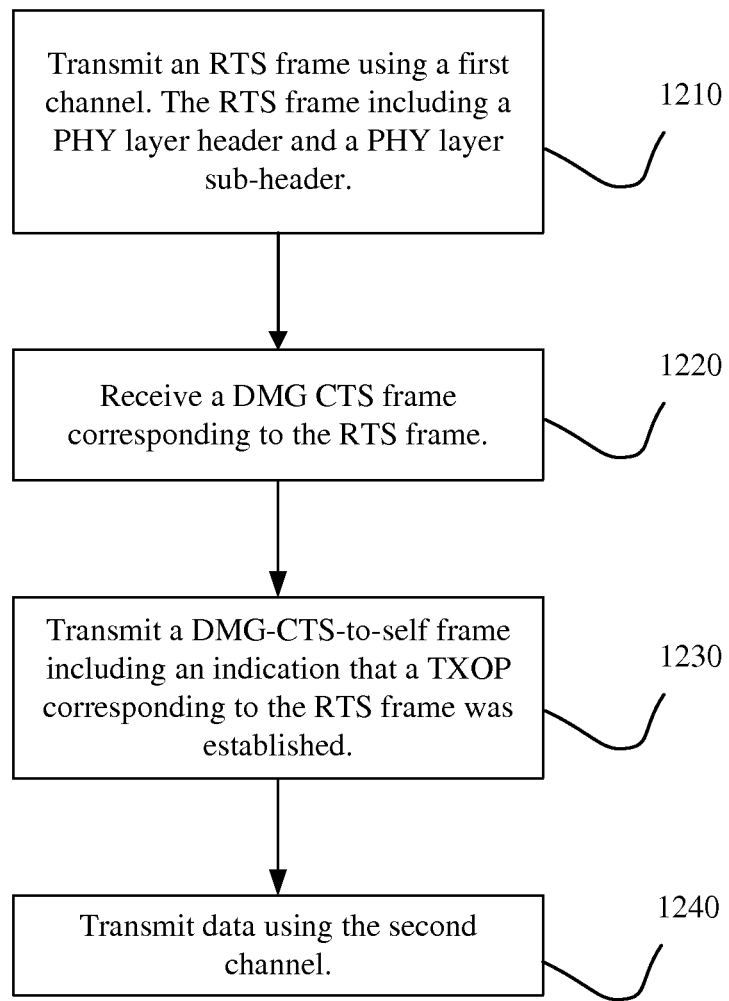
FIG. 6-7 illustrate examples of logic flows.
Figure 7:
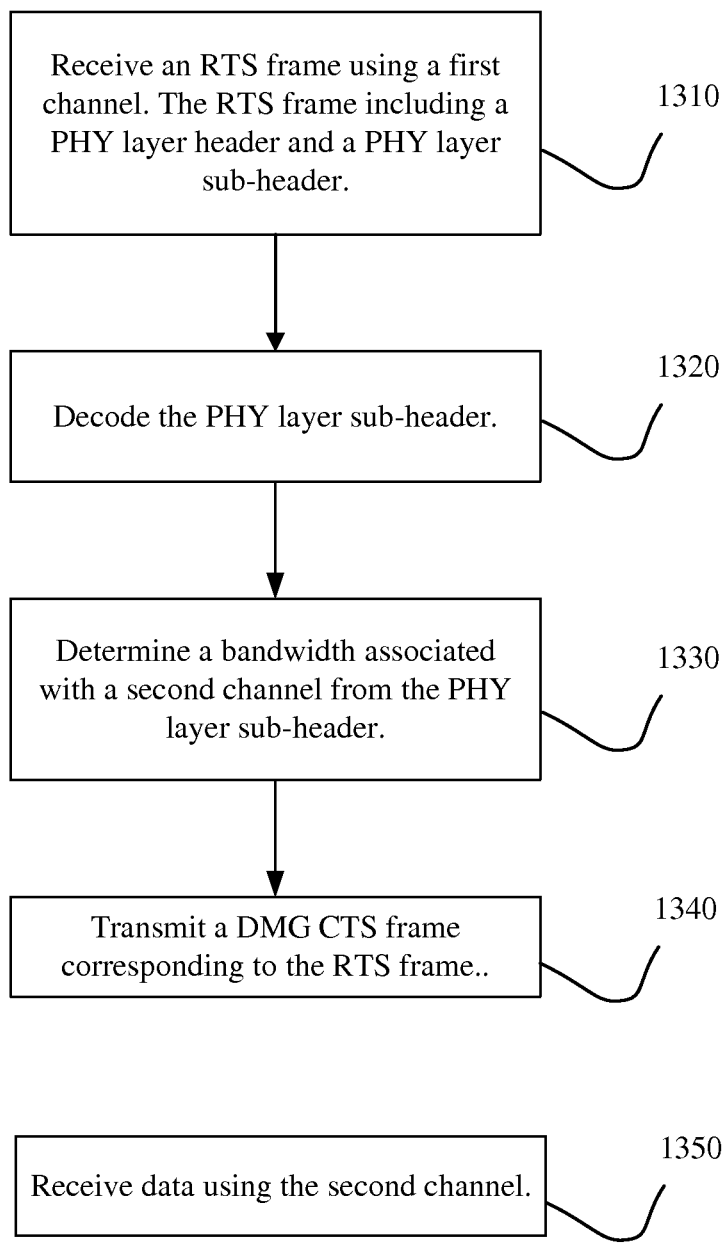

FIGS. 6-7 illustrate examples of logic flows 1200 and 1300, respectively. The logic flows may be representative of some or all of the operations executed by one or more logic, features, or devices described herein. In general, the logic flow 1200 may be representative of some or all of the operations executed by logic and/or features of the transmitting station 100. In general, the logic flow 1300 may be representative of some or all of the operations executed by logic and/or features of the receiving station 200.

Turning more specifically to FIG. 6, the station 100 and/or 200 may implement the logic flow 1200. In the logic flow 1200, at block 1210, a transmitting station transmits an RTS frame using a first channel, where the RTS frame includes a PHY layer sub-header. For example, the transmitting station 100 may transmit the RTS frame 500. More specifically, the transmitter 112-1 may transmit the RTS frame 500. As detailed above, the RTS frame 500 includes the PHY layer sub-header(s) 532-1 and 532-2. The PHY layer sub-headers 532-1 and 532-2 include indications of bandwidth and/or MIMO schemes corresponding to the second channel 420.

At block 1220, the transmitting station receives a DMG CTS frame corresponding to the RTS frame. For example, the transmitting station 100 may receive the DMG CTS 600-1. More specifically, the receiver 112-2 may receive the DMG CTS 600-1 (e.g., from the receiving station 200).

At block 1230, the transmitting station transmits a DMG CTS-to-self frame. For example, the transmitting station can transmit the DMG CTS-to-self frame 600-2. More specifically, the transmitter 112-1 may transmit the DMG CTS-to-self frame 600-2.

At block 1240, the transmitting station transmits data and/or receives an acknowledgement on the second channel. For example, the transmitting station 100 may transmit data and receive an acknowledgment on the second channel 420.

Turning more specifically to FIG. 7, the station 100 and/or 200 may implement the logic flow 1300. In the logic flow 1300, at block 1310, a receiving station receives an RTS frame over a first channel. The RTS frame including a PHY layer sub-header that includes an indication of a bandwidth and/or MIMO scheme corresponding to a second channel. For example, the receiving station 200 may receive the RTS frame 500. More specifically, the receiver 212-1 may receive the RTS frame 500.

At block 1320, the receiving station decodes the PHY layer sub-header. For example, the receiving station 200 may decode the PHY layer sub-header(s) 532-1 and 532-2. More specifically, the dynamic bandwidth manager 112-3 may decode the PHY layer sub-headers 532-1 and 532-2.

At block 1330, the receiving station determines a bandwidth associated with the second channel. For example, the receiving station 200 may determine a bandwidth associated with the second channel 420. More specifically, the dynamic bandwidth manager 212-3 may determine a bandwidth and/or MIMO scheme associated with the second channel 420 from the PHY layer sub-header(s) 532-1 and 532-2.

At block 1340, the receiving station transmits a DMG CTS frame corresponding to the RTS frame. For example, the receiving station 200 can transmit the DMG CTS frame 600-1 to the transmitting station 100. More specifically, the transmitter 212-2 may transmit the DMG CTS frame 600-1.

At block 1350, the receiving station receives data and/or transmits an acknowledgement on the second channel. For example, the receiving station 200 may receive data and transmit an acknowledgment on the second channel 420.

Figure 8:
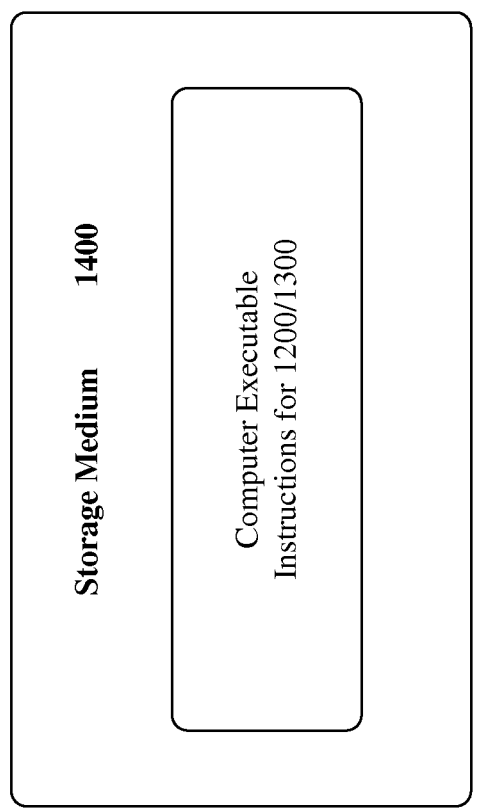
FIG. 8 illustrates a storage medium according to an embodiment.

FIG. 8 illustrates an embodiment of a storage medium 1400. The storage medium 1400 may comprise an article of manufacture. In some examples, the storage medium 1400 may include any non-transitory computer readable medium or machine readable medium, such as an optical, magnetic or semiconductor storage. The storage medium 1400 may store various types of computer executable instructions. For example, the storage medium 1400 may store various types of computer executable instructions to implement logic flow 1200. In some examples, the storage medium 1400 may store various types of computer executable instructions to implement logic flow 1300.

Examples of a computer readable or machine readable storage medium may include any tangible media capable of storing electronic data, including volatile memory or non-volatile memory, removable or non-removable memory, erasable or non-erasable memory, writeable or re-writeable memory, and so forth. Examples of computer executable instructions may include any suitable type of code, such as source code, compiled code, interpreted code, executable code, static code, dynamic code, object-oriented code, visual code, and the like. The examples are not limited in this context.

FIG. 9 illustrates an embodiment of a device 2000. In some examples, device 2000 may be configured or arranged for wireless communications in a wireless network such as the network 1000 shown in FIG. 1. In some examples, the transmitting station 100 may be implemented in the device 2000. For example, the device 2000 may implement the station as apparatus 100. With some examples, the receiving station 200 may be implemented in the device 2000. For example, the device 2000 may implement the receiving station as apparatus 200. In some examples, the mobile device 300-a may be implemented in the device 2000. Additionally, the device 2000 may implement storage medium 1400 and/or a logic circuit 1200/1300. The logic circuits may include physical circuits to perform operations described for the apparatus 100, apparatus 200, storage medium 1400, logic flow 1200, and/or logic flow 1300. As shown in FIG. 9, device 2000 may include a radio interface 2110, baseband circuitry 2120, and computing platform 2130, although examples are not limited to this configuration.

The device 2000 may implement some or all of the structure and/or operations for the apparatus 100/200, the storage medium 1400 and/or the logic circuit 1200/1300 in a single computing entity, such as entirely within a single device. The embodiments are not limited in this context.

Radio interface 2110 may include a component or combination of components adapted for transmitting and/or receiving single carrier or multi-carrier modulated signals (e.g., including complementary code keying (CCK) and/or orthogonal frequency division multiplexing (OFDM) symbols and/or single carrier frequency division multiplexing (SC-FDM symbols) although the embodiments are not limited to any specific over-the-air interface or modulation scheme. Radio interface 2110 may include, for example, a receiver 2112, a transmitter 2116 and/or a frequency synthesizer 2114. Radio interface 2110 may include bias controls, a crystal oscillator and antennas 2118-1 to 2118-f. In another embodiment, radio interface 2110 may use external voltage-controlled oscillators (VCOs), surface acoustic wave filters, intermediate frequency (IF) filters and/or RF filters, as desired. Due to the variety of potential RF interface designs an expansive description thereof is omitted.

Baseband circuitry 2120 may communicate with radio interface 2110 to process receive and/or transmit signals and may include, for example, an analog-to-digital converter 2122 for down converting received signals, a digital-to-analog converter 2124 for up converting signals for transmission. Further, baseband circuitry 2120 may include a baseband or physical layer (PHY) processing circuit 2126 for PHY link layer processing of respective receive/transmit signals. Baseband circuitry 2120 may include, for example, a processing circuit 2128 for medium access control (MAC)/data link layer processing. Baseband circuitry 2120 may include a memory controller 2132 for communicating with MAC processing circuit 2128 and/or a computing platform 2130, for example, via one or more interfaces 2134.

In some embodiments, PHY processing circuit 2126 may include a frame construction and/or detection module, in combination with additional circuitry such as a buffer memory, to construct and/or deconstruct communication frames (e.g., containing subframes). Alternatively or in addition, MAC processing circuit 2128 may share processing for certain of these functions or perform these processes independent of PHY processing circuit 2126. In some embodiments, MAC and PHY processing may be integrated into a single circuit.

Computing platform 2130 may provide computing functionality for device 2000. As shown, computing platform 2130 may include a processing component 2140. In addition to, or alternatively of, baseband circuitry 2120 of device 2000 may execute processing operations or logic for the apparatus 100/200-a/300-a, storage medium 800, and logic circuit 400/500/600/700 using the processing component 2130. Processing component 2140 (and/or PHY 2126 and/or MAC 2128) may comprise various hardware elements, software elements, or a combination of both. Examples of hardware elements may include devices, logic devices, components, processors, microprocessors, circuits, processor circuits, circuit elements (e.g., transistors, resistors, capacitors, inductors, and so forth), integrated circuits, application specific integrated circuits (ASIC), programmable logic devices (PLD), digital signal processors (DSP), field programmable gate array (FPGA), memory units, logic gates, registers, semiconductor device, chips, microchips, chip sets, and so forth. Examples of software elements may include software components, programs, applications, computer programs, application programs, system programs, software development programs, machine programs, operating system software, middleware, firmware, software modules, routines, subroutines, functions, methods, procedures, software interfaces, application program interfaces (API), instruction sets, computing code, computer code, code segments, computer code segments, words, values, symbols, or any combination thereof. Determining whether an example is implemented using hardware elements and/or software elements may vary in accordance with any number of factors, such as desired computational rate, power levels, heat tolerances, processing cycle budget, input data rates, output data rates, memory resources, data bus speeds and other design or performance constraints, as desired for a given example.

Computing platform 2130 may further include other platform components 2150. Other platform components 2150 include common computing elements, such as one or more processors, multi-core processors, co-processors, memory units, chipsets, controllers, peripherals, interfaces, oscillators, timing devices, video cards, audio cards, multimedia input/output (I/O) components (e.g., digital displays), power supplies, and so forth. Examples of memory units may include without limitation various types of computer readable and machine readable storage media in the form of one or more higher speed memory units, such as read-only memory (ROM), random-access memory (RAM), dynamic RAM (DRAM), Double-Data-Rate DRAM (DDRAM), synchronous DRAM (SDRAM), static RAM (SRAM), programmable ROM (PROM), erasable programmable ROM (EPROM), electrically erasable programmable ROM (EEPROM), flash memory, polymer memory such as ferroelectric polymer memory, ovonic memory, phase change or ferroelectric memory, silicon-oxide-nitride-oxide-silicon (SONOS) memory, magnetic or optical cards, an array of devices such as Redundant Array of Independent Disks (RAID) drives, solid state memory devices (e.g., USB memory, solid state drives (SSD) and any other type of storage media suitable for storing information.

Computing platform 2130 may further include a network interface 2160. In some examples, network interface 2160 may include logic and/or features to support network interfaces operated in compliance with one or more wireless broadband technologies such as those described in one or more standards associated with IEEE 802.11 such as IEEE 802.11u or with technical specification such as WFA Hotspot 2.0.

Device 2000 may be part of a source or destination node in a MIMO system and may be included in various types of computing devices to include, but not limited to, user equipment, a computer, a personal computer (PC), a desktop computer, a laptop computer, a notebook computer, a netbook computer, a tablet computer, an ultra-book computer, a smart phone, embedded electronics, a gaming console, a server, a server array or server farm, a web server, a network server, an Internet server, a work station, a mini-computer, a main frame computer, a supercomputer, a network appliance, a web appliance, a distributed computing system, multiprocessor systems, processor-based systems, or combination thereof. Accordingly, functions and/or specific configurations of device 2000 described herein; may be included or omitted in various embodiments of device 2000, as suitably desired. In some embodiments, device 2000 may be configured to be compatible with protocols and frequencies associated with IEEE 802.11 Standards or Specification and/or 3GPP Standards or Specifications for MIMO systems, although the examples are not limited in this respect.

The components and features of device 2000 may be implemented using any combination of discrete circuitry, application specific integrated circuits (ASICs), logic gates and/or single chip architectures. Further, the features of device 2000 may be implemented using microcontrollers, programmable logic arrays and/or microprocessors or any combination of the foregoing where suitably appropriate. It is noted that hardware, firmware and/or software elements may be collectively or individually referred to herein as "logic" or "circuit."

It should be appreciated that the exemplary device 2000 shown in the block diagram of FIG. 9 may represent one functionally descriptive example of many potential implementations. Accordingly, division, omission or inclusion of block functions depicted in the accompanying figures does not infer that the hardware components, circuits, software and/or elements for implementing these functions would be necessarily be divided, omitted, or included in embodiments.

Some examples may be described using the expression "in one example" or "an example" along with their derivatives. These terms mean that a particular feature, structure, or characteristic described in connection with the example is included in at least one example. The appearances of the phrase "in one example" in various places in the specification are not necessarily all referring to the same example.

Some examples may be described using the expression "coupled", "connected", or "capable of being coupled" along with their derivatives. These terms are not necessarily intended as synonyms for each other. For example, descriptions using the terms "connected" and/or "coupled" may indicate that two or more elements are in direct physical or electrical contact with each other. The term "coupled," however, may also mean that two or more elements are not in direct contact with each other, but yet still co-operate or interact with each other.

What has been described above includes examples of the disclosed architecture. It is, of course, not possible to describe every conceivable combination of components and/or methodologies, but one of ordinary skill in the art may recognize that many further combinations and permutations are possible. Accordingly, the novel architecture is intended to embrace all such alterations, modifications and variations that fall within the spirit and scope of the appended claims. The detailed disclosure now turns to providing examples that pertain to further embodiments. The examples provided below are not intended to be limiting.

Example 1

An apparatus for a station in a wireless network. The example including circuitry; and a transmitter operably coupled to the circuitry and configured to cause the circuitry to transmit a first frame, the frame transmitted using a first millimeter wave channel and including a PHY layer header and a PHY layer sub-header, the PHY layer sub-header including an indication of a second channel to be used to communicate data, the first channel different from the second channel.

Example 2

The apparatus of example 1, further including a receiver operably coupled to the circuitry and configured to cause the circuitry to receive a second frame, the transmitter further configured to cause the circuitry to transmit a third frame including an indication that a transmit opportunity (TXOP) corresponding to the first frame and the second frame was established, the third frame transmitted at least in part in response to receiving the second frame.

Example 3

The apparatus of example 2, the transmitter further configured to cause the circuitry to transmit data using the second channel.

Example 4

The apparatus example 3, further comprising a plurality of antennas, the PHY layer sub-header including an indication of a multiple-input multiple-output (MIMO) transmission scheme to be used to communicate data using the second channel, the MIMO scheme utilizing one or more of the plurality of antennas.

Example 5

The apparatus of example 4, the first frame further including a MIMO training field sub-header including an indication of one or more MIMO training sequences to be used in establishing communication using the second channel.

Example 6

The apparatus of example 4, the PHY layer sub-header including an indication of bandwidth to be used to communicate data using the second channel.

Example 7

The apparatus of example 4, the PHY layer header including a bit that indicates the presence of the PHY layer sub-header.

Example 8

The apparatus of example 4, further comprising a plurality of antennas, wherein the PHY layer sub-header is a first PHY layer sub-header, the first frame further including a second PHY layer sub-header, the second PHY layer sub-header including an indication of one or more MIMO training sequences.

Example 9

The apparatus of example 8, the PHY layer header including a first bit that indicates the presence of the first PHY layer sub-header and a second bit that indicates the presence of the second PHY layer sub-header.

Example 10

The apparatus of example 9, the first and second bits corresponding to reserved bits in the PHY layer header.

Example 11

The apparatus of example 9, the first bit corresponding to a reserved bit in the PHY layer header and the second bit part of the first PHY layer sub-header.

Example 12

The apparatus of any one of examples 1 to 11, wherein the circuitry is physical (PHY) layer circuitry.

Example 13

The apparatus of any one of examples 1 to 11, wherein the circuitry is media access control (MAC) layer circuitry.

Example 12

The apparatus of any one of examples 1 to 11, wherein the circuitry includes both physical (PHY) layer circuitry and media access control (MAC) layer circuitry.

Example 13

The apparatus of any one of examples 1 to 11, wherein the first frame is a request to send (RTS) frame.

Example 14

The apparatus of example 13, wherein the second frame is a directional multi-gigabit (DMG) clear-to-send (CTS) frame corresponding to the RTS frame.

Example 15

The apparatus of example 14, wherein the third frame is a DMG-CTS-to-self frame.

Example 16

The apparatus of example 13, wherein the RTS frame is part of a convergence procedure (PLCP) protocol data unit (PPDU).

Example 17

The apparatus of example 15, wherein the DMG-CTS frame is received from a first node in the wireless network, the DMG-CTS-to-self frame including an indication that one or more other nodes in the wireless network, different from the first node, should refrain from transmitting on the first channel during the TXOP.

Example 18

An apparatus for a station in a wireless network. The apparatus including: circuitry; a receiver operably coupled to the circuitry and configured to cause the circuitry to receive a first frame, the first frame received over a first millimeter wave channel and including a PHY layer header and a PHY layer sub-header, the PHY layer sub-header including an indication of a second channel to be used to communicate data, the first channel different from the second channel; a dynamic bandwidth manager configured to decode the PHY layer sub-header and determine at least a bandwidth corresponding to the second channel; and a transmitter operably coupled to the circuitry and configured to cause the circuitry to transmit a second frame corresponding to the first frame; the receiver further configured to cause the circuitry to receive data using the second channel based at least in part on the bandwidth.

Example 19

The apparatus of example 18, further comprising a plurality of antennas, the PHY layer sub-header including an indication of a multiple-input multiple-output (MIMO) transmission scheme to be used to communicate data using the second channel, the MIMO scheme utilizing one or more of the plurality of antennas.

Example 20

The apparatus of example 19, the first frame further including a MIMO training field sub-header including an indication of one or more MIMO training sequences to be used in establishing communication using the second channel.

Example 21

The apparatus of example 18, the PHY layer sub-header including an indication of the bandwidth corresponding to the second channel.

Example 22

The apparatus of example 18, the PHY layer header including a bit that indicates the presence of the PHY layer sub-header.

Example 23

The apparatus of example 19, further comprising a plurality of antennas, wherein the PHY layer sub-header is a first PHY layer sub-header, the first frame further including a second PHY layer sub-header, the second PHY layer sub-header including an indication of one or more MIMO training sequences.

Example 24

The apparatus of example 23, the PHY layer header including a bit that indicates the presence of the first PHY layer sub-header.

Example 25

The apparatus of example 24, the bit corresponding to a reserved bit in the PHY layer header.

Example 26

The apparatus of example 24, the first PHY layer sub-header including a bit that indicates the presence of the second PHY layer sub-header.

Example 27

The apparatus of example 18, wherein the circuitry is physical (PHY) layer circuitry.

Example 28

The apparatus of any one of examples 18 to 27, wherein the first frame is a request to send (RTS) frame.

Example 29

The apparatus of example 28, wherein the RTS frame is part of a convergence procedure (PLCP) protocol data unit (PPDU).

Example 30

The apparatus of example 28, wherein the second frame is a directional multi-gigabit (DMG) clear-to-send (CTS) frame corresponding to the RTS frame.

Example 31

The apparatus of example 29, wherein the third frame is a DMG-CTS-to-self frame.

Example 32

A method implemented by a station in a wireless network. The method including: transmitting a first frame, the first frame transmitted using a first millimeter wave channel and including a PHY layer header and a PHY layer sub-header, the PHY layer sub-header including an indication of a second channel to be used to communicate data, the first channel different from the second channel.

Example 33

The method of example 32, further comprising: receiving a second frame corresponding to the first frame; and transmitting a third frame including an indication that a transmit opportunity (TXOP) corresponding to the first frame was established, the third frame transmitted at least in part in response to receiving the second frame.

Example 34

The method of example 33, further comprising transmitting data using the second channel.

Example 35

The method of example 34, the PHY layer sub-header including an indication of a multiple-input multiple-output (MIMO) transmission scheme to be used to communicate data using the second channel, the MIMO scheme utilizing one or more of a plurality of antennas.

Example 36

The method of example 35, the first frame further including a MIMO training field sub-header including an indication of one or more MIMO training sequences to be used in establishing communication using the second channel.

Example 37

The method of example 35, the PHY layer sub-header including an indication of bandwidth to be used to communicate data using the second channel.

Example 38

The method of example 35, the PHY layer header including a bit that indicates the presence of the PHY layer sub-header.

Example 39

The method of example 35, wherein the PHY layer sub-header is a first PHY layer sub-header, the RTS frame further including a second PHY layer sub-header, the second PHY layer sub-header including an indication of one or more MIMO training sequences.

Example 40

The method of example 35, the PHY layer header including a first bit that indicates the presence of the first PHY layer sub-header and a second bit that indicates the presence of the second PHY layer sub-header.

Example 41

The method of example 40, the first and second bits corresponding to reserved bits in the PHY layer header.

Example 42

The method any one of examples 33 to 41, wherein the first frame is a request to send (RTS) frame.

Example 43

The apparatus of example 42, wherein the second frame is a directional multi-gigabit (DMG) clear-to-send (CTS) frame corresponding to the RTS frame and the third frame is a DMG-CTS-to-self frame.

Example 44

The method of example 43, wherein the RTS frame is part of a convergence procedure (PLCP) protocol data unit (PPDU).

Example 45

The method of example 43, wherein the DMG-CTS frame is received from a first node in the wireless network, the DMG-CTS-to-self frame including an indication that one or more other nodes in the wireless network, different from the first node, should refrain from transmitting on the first channel during the TXOP.

Example 46

A method implemented by a station in a wireless network. The method including: receiving a first frame, the first frame received over a first millimeter wave channel and including a PHY layer header and a PHY layer sub-header, the PHY layer sub-header including an indication of a second channel to be used to communicate data, the first channel different from the second channel; decoding the PHY layer sub-header; determining at least a bandwidth corresponding to the second channel based on the decoded PHY layer sub-header; transmitting a second frame corresponding to the first frame; and receiving data using the second channel based at least in part on the bandwidth.

Example 47

The method of example 46, the PHY layer sub-header including an indication of a multiple-input multiple-output (MIMO) transmission scheme to be used to communicate data using the second channel, the MIMO scheme utilizing one or more of a plurality of antennas.

Example 48

The method of example 47, the first frame further including a MIMO training field sub-header including an indication of one or more MIMO training sequences to be used in establishing communication using the second channel.

Example 49

The method of example 48, the PHY layer sub-header including an indication of bandwidth corresponding to the second channel.

Example 50

The method of example 49, the PHY layer header including a bit that indicates the presence of the PHY layer sub-header.

Example 51

The method of example 46, wherein the PHY layer sub-header is a first PHY layer sub-header, the RTS frame further including a second PHY layer sub-header, the second PHY layer sub-header including an indication of one or more MIMO training sequences.

Example 52

The method of example 51, the first PHY layer sub-header including a bit that indicates the presence of the second PHY layer sub-header.

Example 53

The method any one of examples 46 to 52, wherein the first frame is a request to send (RTS) frame.

Example 54

The apparatus of example 53, wherein the second frame is a directional multi-gigabit (DMG) clear-to-send (CTS) frame corresponding to the RTS frame and the third frame is a DMG-CTS-to-self frame.

Example 55

The method of example 53, wherein the RTS frame is part of a convergence procedure (PLCP) protocol data unit (PPDU).

Example 56

An apparatus comprising means to perform the method of any of examples 32 to 55.

Example 57

At least one machine readable medium comprising a plurality of instructions that in response to being executed on a transmitter node and/or a receiver node in a wireless network cause any one the transmitter node and/or receiver node to perform the method of any of examples 32 to 55.

Example 58

An apparatus for a wireless network comprising: a processor; a radio operably connected to the processor; one or more antennas operably connected to the radio to transmit or receive wireless signals; and a memory comprising a plurality of instructions that in response to being executed by the processor cause the processor or the radio to perform the method of any of examples 32 to 55.

What is claimed is:

1. An apparatus for a station in a wireless network comprising:
   circuitry to generate a first frame including a PHY layer header comprising a first PHY layer sub-header and a second PHY layer sub-header, the first PHY layer sub-header including an indication of a channel to be used to communicate data and the second PHY layer sub-header including an indication of one or more multiple-input multiple-output (MIMO) training sequences, the PHY layer header including a first bit that indicates the presence of the first PHY layer sub-header and a second bit that indicates the presence of the second PHY layer sub-header; and
   a transmitter operably coupled to the circuitry and configured to cause the circuitry to transmit the first frame, the first frame transmitted using a first millimeter wave channel, the first millimeter wave channel different from the channel.

2. The apparatus of claim 1, further comprising:
   a receiver operably coupled to the circuitry and configured to cause the circuitry to receive a second frame, the transmitter further configured to cause the circuitry to transmit a third frame including an indication that a transmit opportunity (TXOP) corresponding to the first frame and the second frame was established, the third frame transmitted at least in part in response to receiving the second frame.

3. The apparatus of claim 2, the transmitter further configured to cause the circuitry to transmit data using the channel.

4. The apparatus claim 3, further comprising a plurality of antennas, the first PHY layer sub-header including an indication of a MIMO transmission scheme to be used to communicate data using the channel, the MIMO transmission scheme utilizing one or more of the plurality of antennas.

5. The apparatus of claim 1, the one or more MIMO training sequences to be used in establishing communication using the channel.

6. The apparatus of claim 1, the first PHY layer sub-header including an indication of bandwidth to be used to communicate data using the channel.

7. The apparatus of claim 1, the first bit corresponding to a reserved bit in the PHY layer header and the second bit included in the first PHY layer sub-header.

8. The apparatus of claim 1, wherein the first frame is a request to send (RTS) frame.

9. The apparatus of claim 2, wherein the first frame is a request to send (RTS) frame, the second frame is a directional multi-gigabit (DMG) clear-to-send (CTS) frame corresponding to the RTS frame and the third frame is a DMG-CTS-to-self frame.

10. The apparatus of claim 9, wherein the DMG-CTS frame is received from a first node in the wireless network, the DMG-CTS-to-self frame including an indication that one or more other nodes in the wireless network, different from the first node, should refrain from transmitting on the first channel during the TXOP.

11. An apparatus for a station in a wireless network comprising:
    circuitry;
    a receiver operably coupled to the circuitry and configured to cause the circuitry to receive a first frame, the first frame transmitted using a first millimeter wave channel and including a PHY layer header and a first PHY layer sub-header and a second PHY layer sub-header, the first PHY layer sub-header including an indication of a second channel to be used to communicate data, the first channel different from the second channel, and the second PHY layer sub-header including an indication of one or more multiple-input multiple-output (MIMO) training sequences, the PHY layer header including a first bit that indicates the presence of the first PHY layer sub-header and a second bit that indicates the presence of the second PHY layer sub-header;
    a dynamic bandwidth manager configured to decode the first PHY layer sub-header and determine at least a bandwidth corresponding to the second channel; and
    a transmitter operably coupled to the circuitry and configured to cause the circuitry to transmit a second frame corresponding to the first frame;
    the receiver further configured to cause the circuitry to receive data using the second channel based at least in part on the bandwidth.

12. The apparatus of claim 11, further comprising a plurality of antennas, the first PHY layer sub-header including an indication of a MIMO transmission scheme to be used to communicate data using the second channel, the MIMO transmission scheme utilizing one or more of the plurality of antennas.

13. The apparatus of claim 11, the one or more MIMO training sequences to be used in establishing communication using the second channel.

14. The apparatus of claim 11, the first PHY layer sub-header including an indication of the bandwidth corresponding to the second channel.

15. A method implemented by a station in a wireless network comprising:
    generating, via circuitry, a first frame including a PHY layer header comprising a first PHY layer sub-header and a second PHY layer sub-header, the first PHY layer sub-header including an indication of a channel to be used to communicate data and the second PHY layer sub-header including an indication of one or more multiple-input multiple-output (MIMO) training sequences, the PHY layer header including a first bit that indicates the presence of the first PHY layer sub-header and a second bit that indicates the presence of the second PHY layer sub-header; and
    transmitting, via the circuitry coupled with a transmitter, the first frame using a first millimeter wave channel, the first millimeter wave channel different from the channel.

16. The method of claim 15, further comprising:
    receiving a second frame corresponding to the first frame;
    transmitting a third frame including an indication that a transmit opportunity (TXOP) corresponding to the first frame was established, the third frame transmitted at least in part in response to receiving the second frame.

17. The method claim 16, wherein the first frame is a request to send (RTS) frame, the second frame is a directional multi-gigabit (DMG) clear-to-send (CTS) frame corresponding to the RTS frame and the third frame is a DMG-CTS-to-self frame.

18. The method of claim 17, wherein the DMG-CTS frame is received from a first node in the wireless network, the DMG-CTS-to-self frame including an indication that one or more other nodes in the wireless network, different from the first node, should refrain from transmitting on the first channel during the TXOP.

19. A method implemented by a station in a wireless network comprising:
- receiving a first frame, the first frame received over a first millimeter wave channel and including a PHY layer header comprising a first PHY layer sub-header and a second PHY layer sub-header, the first PHY layer sub-header including an indication of a second channel to be used to communicate data and the second PHY layer sub-header including an indication of one or more multiple-input multiple-output (MIMO) training sequences, the first channel different from the second channel and the PHY layer header including a first bit that indicates the presence of the first PHY layer sub-header and a second bit that indicates the presence of the second PHY layer sub-header;
- decoding the first PHY layer sub-header;
- determining at least a bandwidth corresponding to the second channel based on the decoded PHY layer sub-header;
- transmitting a second frame corresponding to the first frame; and
- receiving data using the second channel based at least in part on the bandwidth.

20. The method of claim 19, the first PHY layer sub-header including an indication of a MIMO transmission scheme to be used to communicate data using the second channel, the MIMO transmission scheme utilizing one or more of a plurality of antennas.

* * * * *

UNITED STATES PATENT AND TRADEMARK OFFICE
CERTIFICATE OF CORRECTION

PATENT NO. : 9,584,195 B2
APPLICATION NO. : 14/293878
DATED : February 28, 2017
INVENTOR(S) : Carlos Cordeiro et al.

It is certified that error appears in the above-identified patent and that said Letters Patent is hereby corrected as shown below:

In the Claims

Column 21, Line 18, replace "... on the decoded PHY layer sub-header" with -- on the decoded first PHY sub-header --.

Signed and Sealed this
Tenth Day of October, 2017

Joseph Matal
*Performing the Functions and Duties of the*
*Under Secretary of Commerce for Intellectual Property and*
*Director of the United States Patent and Trademark Office*